(12) United States Patent
Ban et al.

(10) Patent No.: US 6,984,814 B2
(45) Date of Patent: Jan. 10, 2006

(54) OPTICAL SENSING CIRCUIT WITH VOLTAGE TO CURRENT CONVERTER FOR POINTING DEVICE

(75) Inventors: Takayuki Ban, Kanagawa-Ken (JP); Masaru Hashimoto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 245 days.

(21) Appl. No.: 10/373,848

(22) Filed: Feb. 27, 2003

(65) Prior Publication Data

US 2003/0160152 A1 Aug. 28, 2003

(30) Foreign Application Priority Data

Feb. 27, 2002 (JP) ............................. 2002-051979

(51) Int. Cl.
*H01J 4/14* (2006.01)
(52) U.S. Cl. ................... 250/214 R; 327/103; 327/514
(58) Field of Classification Search ............ 250/214 R, 250/208.2, 214 AG; 348/370; 327/77, 103, 327/514; 363/73
See application file for complete search history.

(56) References Cited

U.S. PATENT DOCUMENTS

| | | | |
|---|---|---|---|
| 4,491,807 A | 1/1985 | Hoover | |
| 6,307,196 B1 * | 10/2001 | Thompson et al. | ...... 250/214 A |
| 6,420,912 B1 * | 7/2002 | Hsu et al. | ................... 327/103 |
| 6,586,919 B2 * | 7/2003 | Viehmann | ................... 323/315 |
| 2002/0167344 A1 * | 11/2002 | Zha et al. | ................... 327/103 |
| 2003/0178552 A1 * | 9/2003 | Hofmeister et al. | ...... 250/14 R |

* cited by examiner

*Primary Examiner*—David Porta
*Assistant Examiner*—Davienne Monbleau
(74) *Attorney, Agent, or Firm*—Oblon, Spivak, McClelland, Maier & Neustadt, P.C.

(57) ABSTRACT

An optical sensing circuit is provided with a light detector, a voltage to current conversion circuit connected to the light detector, and a comparator. The voltage to current conversion circuit includes an electric resistor and a current mirror circuit connected in parallel to the resistor. The voltage to current conversion circuit increases an electric current flowing through the circuit as a voltage of the output of the light detector decreases. The comparator compares the voltage of the output of the light detector with a reference voltage.

30 Claims, 13 Drawing Sheets

OPTICAL SENSING CIRCUIT WITH VOLTAGE TO CURRENT CONVERTER FOR POINTING DEVICE

CROSS-REFERENCE TO RELATED APPLICATIONS

This application is based upon and claims the benefit of priority from prior Japanese Patent Application No. P2002-051979, filed on Feb. 27, 2002; the entire contents of which are incorporated herein by reference.

FIELD OF THE INVENTION

The present invention relates to an optical sensing circuit, and more particularly, to a circuit suitable for producing a signal used for detecting a moving amount and a moving direction in a pointing device referred to as a so-called mouse in a computer.

BACKGROUND OF THE INVENTION

FIG. 1 shows a constitution of a conventional optical sensing circuit used for a pointing device. A circuit XCT 100 is provided for producing an X signal indicating a moving amount in an X direction and a moving direction, and a circuit YCT 100 is provided for producing a Y signal indicating a moving amount in a Y direction and a moving direction.

Between a power supply voltage VCC terminal and a ground voltage VSS terminal, a resistor RLED, a light emitting diode (LED) XLED for producing the X signal contained in the circuit XCT 100, and a LED YLED for producing the Y signal contained in the circuit YCT 100 are connected in series in order to reduce the amount of current.

In the circuit XCT 100, two signal producing paths are set up in parallel as a circuit of a photo receiving side. As a first path, a phototransistor X1PT and a resistor X1R are connected in series between the power supply voltage VCC terminal and the ground voltage VSS terminal, and a node X1 between the phototransistor X1PT and the resistor X1R is connected to one input terminal of a comparator X1COMP.

As a second path, a phototransistor X2PT and a resistor X2R are connected in series between the power supply voltage VCC terminal and the ground voltage VSS terminal, and a node X2 between the phototransistor X2PT and the resistor X2R is connected to one input terminal of a comparator X2COMP. Reference voltage Vref is applied to the other input terminal of each of the comparators X1COMP, X2COMP.

A rotary slit XSLT is arranged between the LED XLED and the phototransistors X1PT, X2PT. This rotary slit XSLT is rotated in accordance with movement of the pointing device in an X direction, and transmits light emitted from the LED XLED to the phototransistors X1PT, X2PT, or interrupts it. Here, in the phototransistors X1PT, X2PT, current flow is varied in accordance with the amount of received light, and voltage at the nodes X1, X2 is accordingly varied. The phototransistor X1PT is oriented at predetermined angle relative to the phototransistor X2PT, and voltage waveforms at the nodes X1, X2 have an about 90 degrees phase difference from each other.

Because of the foregoing constitution, the circuit XCT 100 operates as follows. When the pointing device moves in the X direction, the rotary slit XSLT is rotated in accordance with a moving amount and a moving direction thereof, and the amounts of light received at the phototransistors X1PT, X2PT are varied, and currents flowing in X1PT, X2PT are also varied. These variations of currents are converted into voltages by the resistors X1R, X2R, extracted as voltage signals from the nodes X1, X2, and applied to the comparators X1COMP, X2COMP, respectively.

In the comparator X1COMP, the voltage V (X1) at the node X1 is compared with the reference voltage Vref. A low level voltage is outputted when the voltage V (X1) is below the reference voltage Vref, and a high level voltage is outputted when it is not less than the reference voltage Vref. Similarly, in the comparator X2COMP, the voltage V (X2) at the node X2 is compared with the reference voltage Vref. A low level voltage is outputted when the voltage V (X2) is below the reference voltage Vref, and a high level voltage is outputted when it is not less than the reference voltage Vref. Thus, the rotation of the rotary slit XSLT, that is, how far the pointing device moves in the X direction, is detected with the pulse output from the comparator X1COMP. Additionally, because of the phase difference between the signals X1, X2 as described above, a moving direction can also be detected.

The circuit YCT 100 also has a constitution for receiving light from the LED YLED similar to that of the circuit XCT 100. Specifically, the circuit YCT 100 comprises the rotary slit YSLT, phototransistors Y1PT, Y2PT, resistors Y1R, Y2R, and comparators Y1COMP, Y2COMP, and operates similar to the circuit XCT 100. Thus, explanation thereof will be omitted.

However, the following problems have been inherent in such a conventional optical sensing circuit.

FIG. 2A shows respective voltages V (X1), V (X2) at the nodes X1, X2. Further, FIG. 2B shows output waveforms of the comparators X1COMP, X2COMP when a threshold (=reference voltage Vref) of the comparators X1COMP, X2COMP is Vth1 shown in FIG. 2A. FIG. 2C shows output waveforms of the comparators X1COMP, X2COMP when a threshold of the comparators X1COMP, X2COMP is Vth2 shown in FIG. 2A.

To identify a rotational direction of the rotary slit XSLT, the threshold voltage Vth must be in a range between upper and lower points C1, C2 at which the waveforms of the voltages V (X1), V (X2) at the nodes X1, X2 intersect each other.

As the threshold Vth1 ranges between the points C1, C2, for the outputs of the comparators X1COMP, X2COMP, there are an overlapping period 10a of high levels and an overlapping period 10b of low levels as shown in FIG. 2B. In such a case, it is possible to identify the rotational direction of the rotary slit XSLT. For example, in the period 10b where both outputs are low, the output of the comparator X1COMP first rises to a high level, whereby the rotational direction can be detected.

However, if the threshold voltage Vth is at the intersection point C1 as in the case of a threshold Vth2, or above the point C1, as shown in FIG. 2C, there is an overlapping period 12b of low levels while there is no overlapping period 12a of high levels. In such a case, it is impossible to identify the rotational direction of the rotary slit XSLT.

If output characteristics or light intensity of the LED is higher than those shown in FIG. 2A, or sensitivity of the phototransistor is higher, the voltages V (X1), V (X2) at the nodes X1, X2 respectively become similar to those shown in FIG. 3A. FIG. 3B shows respective output waveforms of the comparators X1COMP, X2COMP when threshold of the comparators X1COMP, X2COMP is Vth3 shown in FIG. 3A in this case. FIG. 3C shows respective output waveforms of the comparators X1COMP, X2COMP when threshold of the comparators X1COMP, X2COMP is Vth4 shown in FIG. 3A.

As the threshold Vth3 ranges between points C3, C4 at which the waveforms of the voltages V (X1), V (X2) intersect each other, for outputs of the comparators X1COM, X2COMP, as shown in FIG. 2B, there are an overlapping period 20a of high levels and an overlapping period 20b of low levels. Thus, it is possible to identify the rotational direction of the rotary slit XSLT.

However, if the threshold voltage Vth is at the point C4 of waveform intersection as in the case of a threshold Vth4, or below the point C4, as shown in FIG. 3C, there is an overlapping period 22a of high levels, while there is no overlapping period 22b of low levels. Also in such a case, it is impossible to identify the rotational direction of the rotary slit XSLT.

Normally, the LED or the phototransistor used for the pointing device greatly varies in light intensity or receiving sensitivity even under the same conditions. Accordingly, the respective elements are classified into several ranks and, in accordance with the rank, a value of the resistor RLED or values of the resistors X1R, X2R are adjusted for a normal operation.

However, there is still some variation even among the elements classified into the same rank. Therefore, the distance between the LED and the rotary slit or between the phototransistor and the rotary slit must be adjusted at the end.

Accordingly, if the light intensity emitted from the LED or the receiving sensitivity of the phototransistor is low as shown in FIG. 2A, or if the light intensity emitted from the LED or the receiving sensitivity of the phototransistor is high as shown in FIG. 3A, it may be difficult to set the threshold of the comparators within the range between the upper and lower points at which the waveforms of the output voltages V (X1), V (X2) of the phototransistors intersect each other.

Additionally, if the light intensity emitted from the LED or the receiving sensitivity of the phototransistor is high, as shown in FIG. 3A, the minimum voltage level of the waveforms of the voltages V (X1), V (X2) are considerably higher than the ground voltage VSS. For this reason, the case in which the light emitted from the LED is not interrupted by the rotary slit completely and thus received by the phototransistor, or light reflected on a portion other than the rotary slit is received by the phototransistor, or the like may often occur. If measures taken to counter such a phenomenon depend on mechanical structures or arrangements of the LED, the rotary slit and the phototransistors, the cost of the pointing device itself may be increased.

BRIEF SUMMARY OF THE INVENTION

An optical sensing circuit according to an embodiment of the present invention comprising:

a voltage to current conversion circuit to be connected between a output terminal of a light detector, which terminal output a voltage in accordance with the amount of detected light from a light source, and a second power supply terminal, configured to lower the voltage at the output terminal at by increasing a value of current flowing from the output terminal to the second power supply terminal as the voltage at the output terminal is lowered, and a comparator circuit configured to compare the voltage at the output terminal with a reference voltage, and to output a signal in accordance with a result of the comparison.

A pointing device according to an embodiment of the present invention comprising:

a first optical sensing circuit configured to produce a signal indicating a moving amount and a moving distance in a first direction, and a second optical sensing circuit configured to produce a signal indicating a moving amount and a moving distance in a second direction different from the first direction, each of the first and second optical sensing circuits, comprises a light source;

a first light detector connected between a first power supply terminal and a second power supply terminal, configured to output a first voltage to a first output terminal in accordance with the amount of detected light from the light source;

a second light detector configured to output a second voltage to a second output terminal in accordance with the amount of detected light from the light source, the second voltage having a relative 90 degrees phase difference from the first voltage;

a rotary slit arranged between the light source and the first and second light detector, configured to rotate in accordance with a movement of the pointing device in the first direction or the second direction and to pass or interrupt the light from the light source to the first and second light detectors;

a first voltage to current conversion circuit configured to lower the voltage at the first output terminal by increasing a value of current flowing from the first output terminal as the voltage at the first output terminal is lowered;

a second voltage to current conversion circuit configured to lower the voltage at the second output terminal by increasing a value of current flowing from the second output terminal as the voltage at the second output terminal is lowered;

a first comparator circuit configured to compare the voltage at the first output terminal with a reference voltage, and to output a first signal in accordance with a result of the comparison; and a second comparator circuit configured to compare the voltage at the second output terminal with the reference voltage, and to output a second signal in accordance with a result of the comparison.

An optical sensing circuit according to an embodiment of the present invention comprising:

a voltage to current conversion circuit to be connected to an output of a light detector and configured to increase a value of current flowing through the circuit as a voltage of the output decreases; and a comparator configured to compare the voltage of the output with a reference voltage.

BRIEF DESCRIPTION OF THE DRAWINGS

A more complete appreciation of embodiments of the present invention and many of its attendant advantages will be readily obtained by reference to the following detailed description considered in connection with the accompanying drawings, in which.

DETAILED DESCRIPTION OF THE EMBODIMENTS (1) First Embodiment

Figure 4:
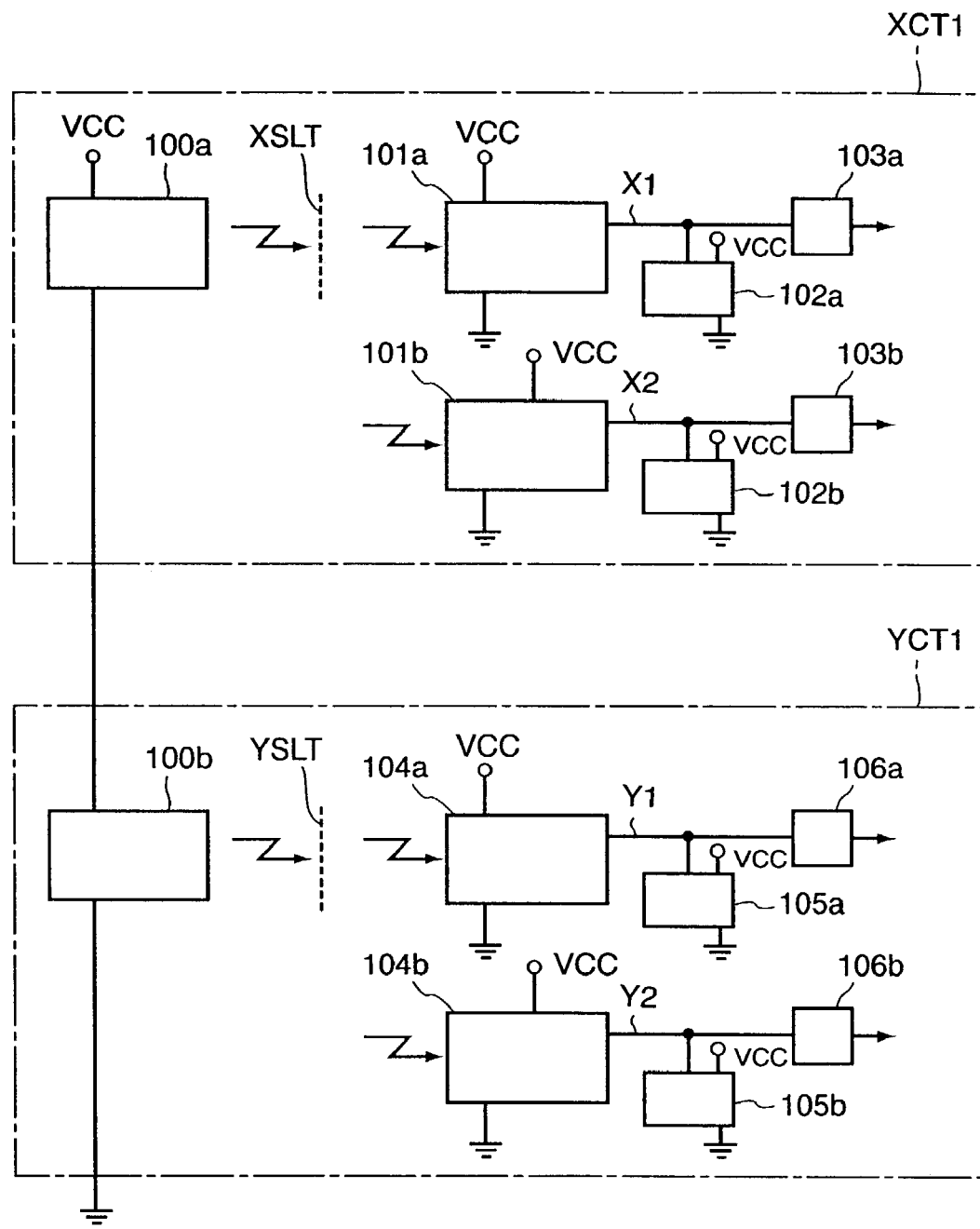
FIG. 4 is a circuit diagram showing a constitution of an optical sensing circuit according to a first embodiment of the present invention.

FIG. 4 shows a constitution of an optical sensing circuit according to a first embodiment of the present invention. This circuit comprises a circuit XCT1 for detecting a moving amount in the X direction of a pointing device and its direction, and a circuit YCT1 for detecting a moving amount in the Y direction and its direction. The circuit XCT1 has an X light emitting portion 100a, X photodetectors 101a, 101b, variable current sources 102a, 102b, and comparators 103a, 103b. The circuit YCT1 has a Y light emitting portion 100b, Y photodetectors 104a, 104b, variable current sources 105a, 105b, and comparators 106a, 106b.

The X light emitting portion 100a and the Y light emitting portion 100b are connected in series between a power supply voltage VCC terminal and a ground voltage VSS terminal to emit light.

In the circuit XCT1, the light emitted from the X light emitting portion 100a is received by the X photodetectors 101a and 101b through a rotary slit XSLT rotated in accordance with a moving amount in the X direction and a moving direction of the pointing device.

In the circuit YCT1, the light emitted from the Y light emitting portion 100b is received by the Y photodetectors 104a and 104b through a rotary slit YSLT rotated in accordance with a moving amount in the Y direction and a moving direction of the pointing device. In the circuit YCT1, optical sensing circuitry and its operation are basically similar to those of the circuit XCT1. Hereinafter, therefore, only the circuit XCT1 will be described, while description of the circuit YCT1 will be omitted.

In the circuit XCT1, in accordance with the amount of light received by the X photodetectors 101a, 101b, voltages V (X1), V (X2) at nodes X1, X2 connected to respective output terminals thereof are varied. The comparator 103a compares a predetermined threshold with the voltage V (X1) at the node X1, and outputs a low level voltage when the voltage V (X1) at the node X1 is below the threshold, and a high level voltage when it is not less than the threshold. Similarly, the comparator 103b compares the voltage V (X2) at the node X2 with a predetermined threshold, and outputs a low level voltage when the voltage V (X2) at the node X2 is below the threshold, and a high level when it is not less than the threshold.

In this case, the variable current sources 102a, 102b are respectively connected between the nodes X1, X2 and the ground voltage VSS terminal. The variable current source 102a increases current flowing from the node X1 to the ground voltage VSS terminal as the voltage V (X1) at the node X1 is lowered, and accordingly operates to accelerate the pace of lowering the voltage V (X1) at the node X1. Similarly, the variable current source 102b increases current flowing from the node X2 to the ground voltage VSS terminal as the voltage V (X2) at the node X2 is lowered, and accordingly operates to accelerate the pace of lowering the voltage V (X2) at the node X2.

Figure 5:
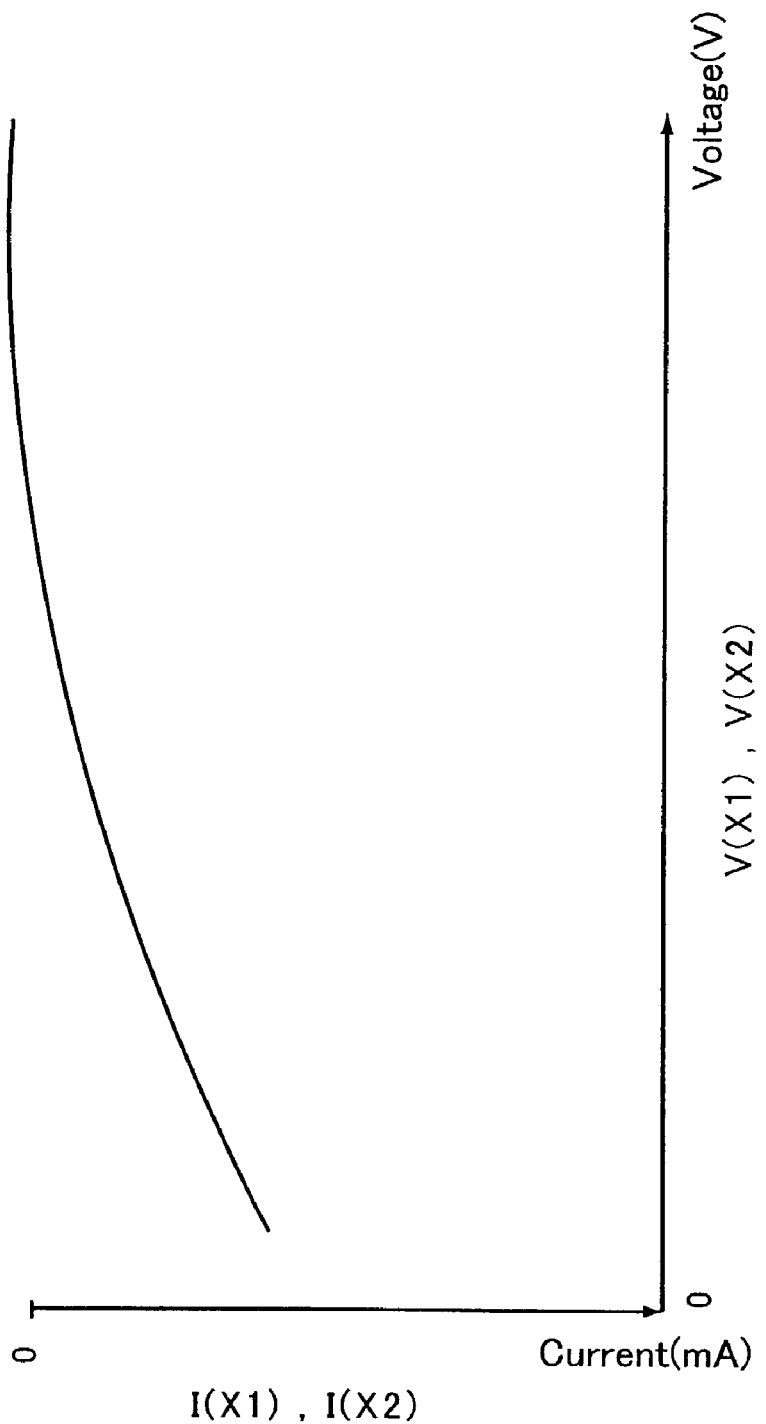
FIG. 5 is a graph showing voltage-current characteristics in an output terminal of a photodetector in the first embodiment.

Since the variable current sources 102a, 102b having such negative resistance characteristics are added to the nodes X1, X2, as shown in FIG. 5, as the voltages V (X1), V (X2) at the nodes X1, X2 are lowered, the currents I (X1), I (X2) flowing from the node X1 to the ground voltage VSS terminal and from the node X2 to the ground voltage VSS terminal, respectively, are increased. Therefore, the voltages at the nodes X1, X2 are lowered at accelerating paces.

As a result, since voltage waveforms at the nodes X1, X2 are lowered to the level of the ground voltage VSS, even if there is variance in light emitting characteristics at the X light emitting portion 100a, or in receiving characteristics of the X photodetectors 101a, 101b, a voltage range within which threshold voltage Vth should be set so as to identify a rotational direction is widened, and the threshold voltage Vth is always raised within the voltage range. Thus, stable outputs can be output from the comparators 103a, 103b, whereby a moving amount in the X direction and a moving direction can be surely detected.

In the aforementioned first embodiment, preferably, light intensity of the LEDs XLED, YLED is set high, and/or receiving sensitivity of the phototransistors X1PT, X2PT, Y1PT, Y2PT is set high.

(2) Second Embodiment

A second embodiment of the present invention corresponds to the first embodiment but realized by a more specific circuit.

Figure 6:
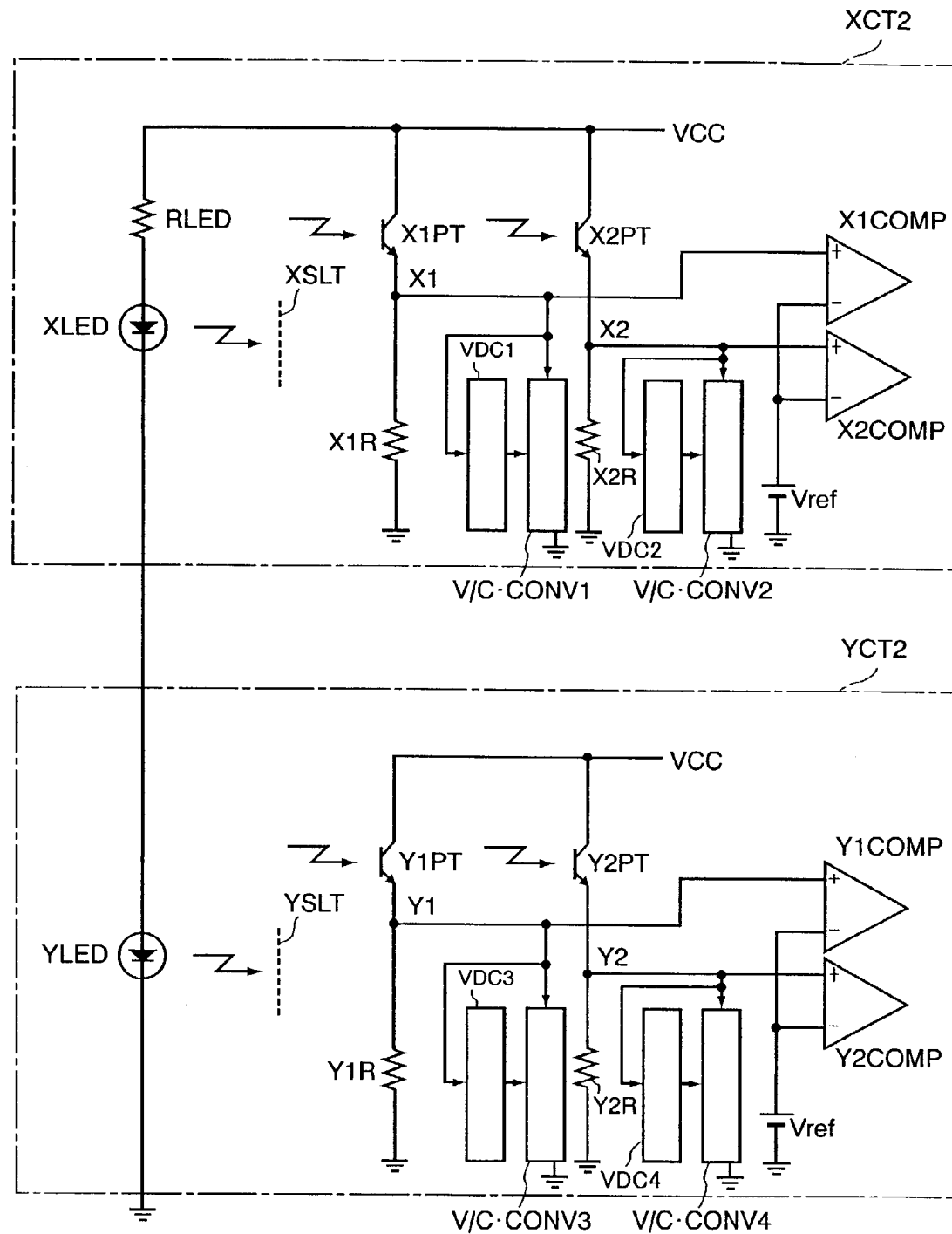
FIG. 6 is a circuit diagram showing a constitution of an optical sensing circuit according to a second embodiment of the present invention.

FIG. 6 shows a constitution of an optical sensing circuit of the second embodiment. Correspondence to the first embodiment is as follows. That is, the circuit XCT1 for detecting the X-direction movement corresponds to a circuit XCT2, the rotary slit XSLT to a rotary slit XSLT, the X light emitting portion 100a to an LED XLED, the X photodetector 101a to a phototransistor X1PT and a resistor X1R, the X photodetector 101b to a phototransistor X2PT and a resistor X2R, the comparator 103a to a comparator X1COMP, the comparator 103b to a comparator X2COMP, the variable current source 102a to a voltage detection circuit VDC1 and a voltage to current conversion circuit V/C·CONV1, the variable current source 102b to a voltage detection circuit VDC2 and a voltage to current conversion circuit V/C·CONV2.

Additionally, the circuit YCT1 for detecting the Y-direction movement corresponds to a circuit YCT2, the rotary slit YSLT to a rotary slit YSLT, the Y light emitting portion 100b to an LED YLED, the Y photodetector 104a to a phototransistor Y1PT and a resistor Y1R, the Y photodetector 104b to a phototransistor Y2PT and a resistor Y2R, the comparator 106a to a comparator Y1COMP, the comparator 106b to a comparator Y2COMP, the variable current source 105a to a voltage detection circuit VDC3 and a voltage to current conversion circuit V/C·CONV3, and the variable current source 105b to a voltage detection circuit VDC4 and a voltage to current conversion circuit V/C·CONV4.

Figure 1:
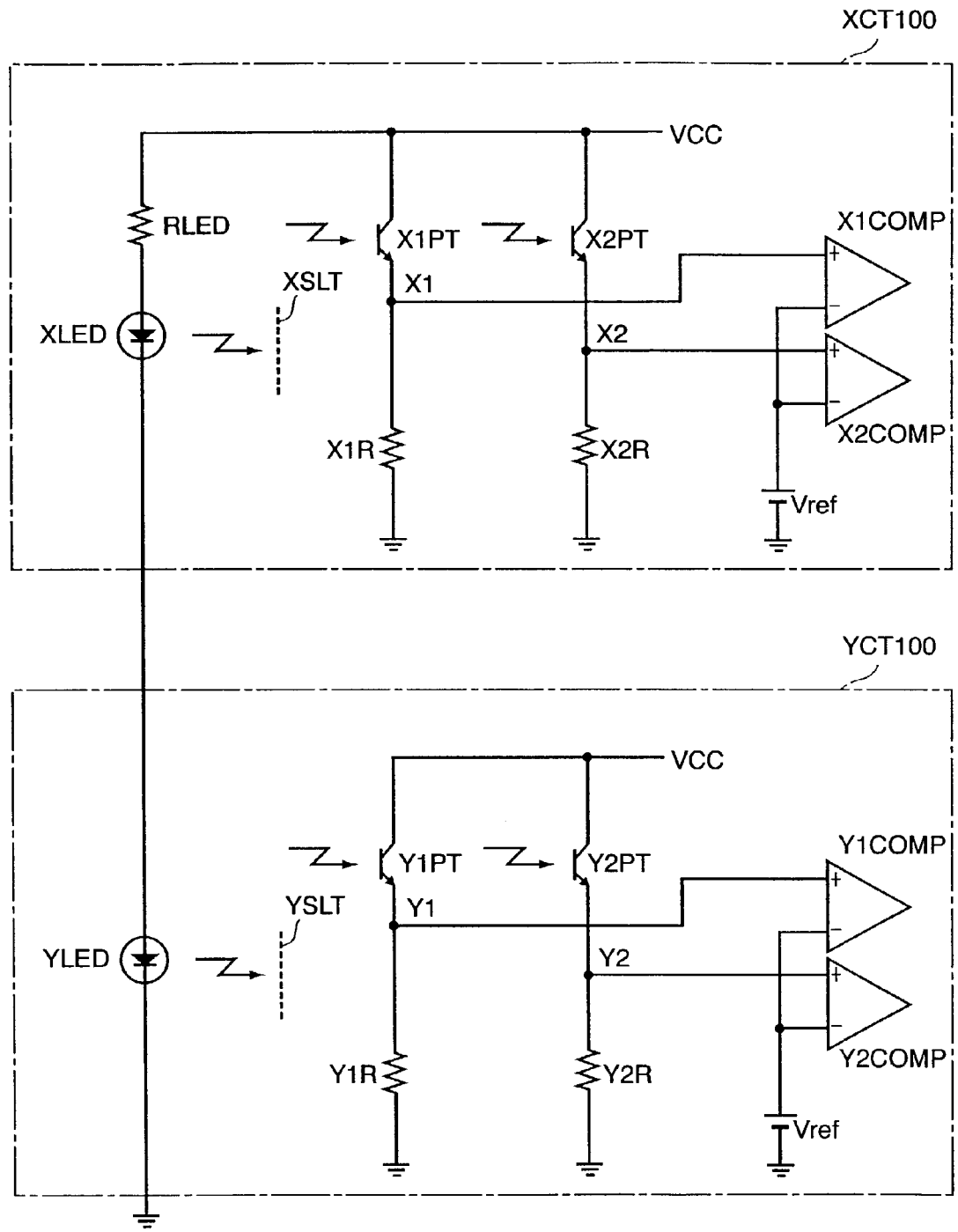
FIG. 1 is a circuit diagram showing a constitution of a conventional optical sensing circuit.
Figure 2A:
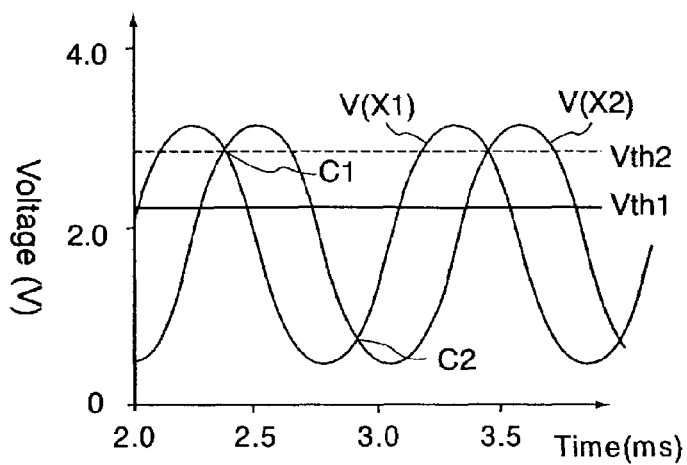
FIG. 2A is a graph showing voltage waveforms at output nodes X1, X2 of phototransistors and thresholds of comparators in the optical sensing circuit shown in FIG. 1.
Figure 2B:
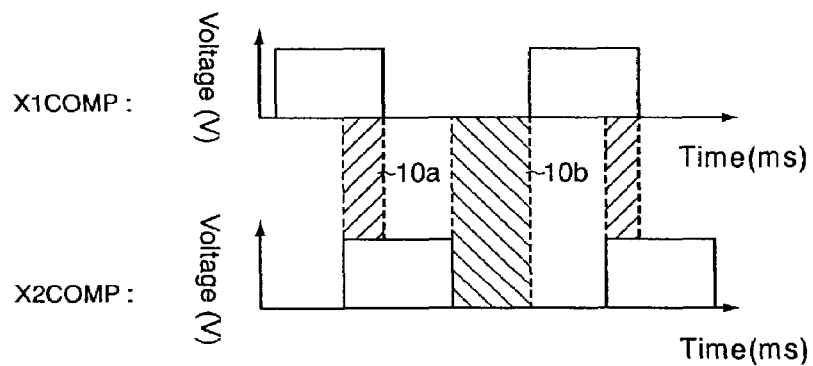
FIG. 2B is a graph showing output waveforms of the comparators X1COMP, X2COMP when the threshold voltage is Vth1 shown in FIG. 2A.
Figure 2C:
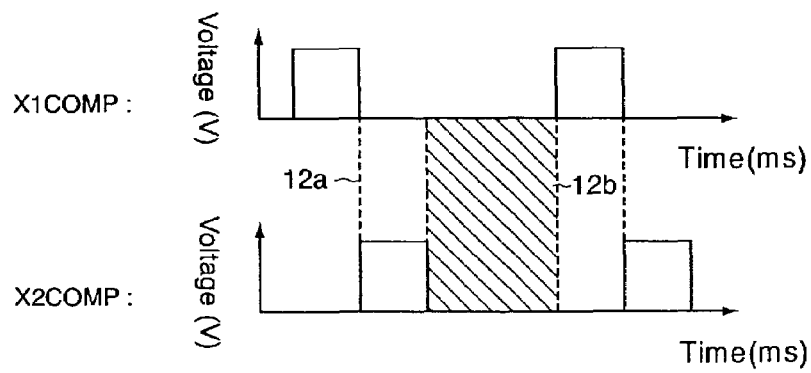
FIG. 2C is a graph showing output waveforms of the comparators X1COMP, X2COMP when the threshold voltage is Vth2 shown in FIG. 2A.
Figure 3A:
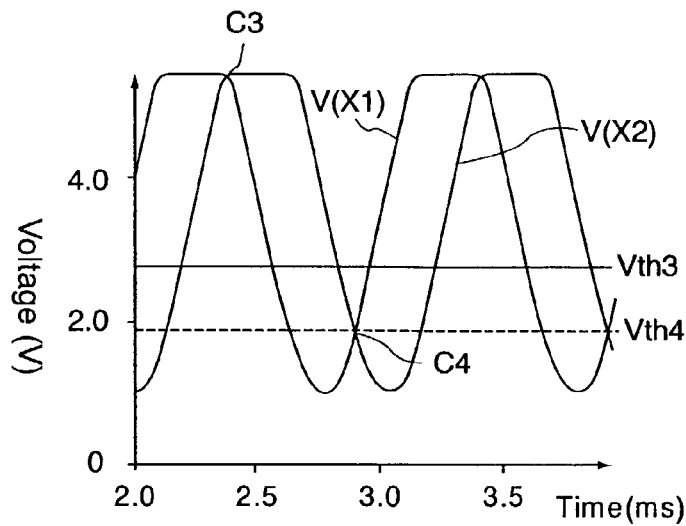
FIG. 3A is a graph showing voltage waveforms at the output nodes X1, X2 of the phototransistors and thresholds of the comparators X1COMP, X2COMP when light intensity of an LED or reception sensitivity of the phototransistor is high in the optical sensing circuit shown in FIG. 1.
Figure 3B:
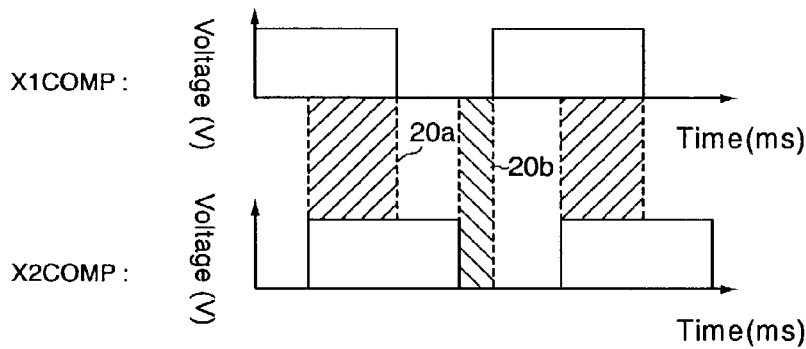
FIG. 3B is a graph showing output waveforms of the comparators X1COMP, X2COMP when the threshold voltage is Vth3 shown in FIG. 3A.
Figure 3C:
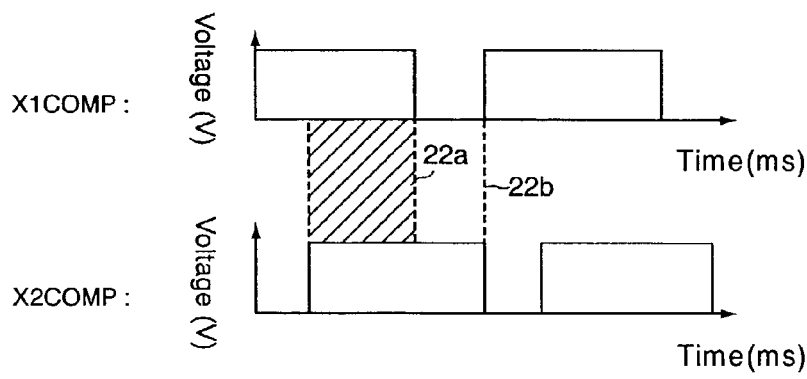
FIG. 3C is a graph showing output waveforms of the comparators X1COMP, X2COMP when the threshold voltage is Vth4 shown in FIG. 3A.

This second embodiment corresponds to the circuit shown in FIG. 1, where the voltage detection circuit VDC1 and the voltage to current conversion circuit V/C·CONV1 are connected to the node X1, the voltage detection circuit VDC2 and the voltage to current conversion circuit V/C·CONV2 to the node X2, the voltage detection circuit VDC3 and the voltage to current conversion circuit V/C·CONV3 to the node Y1, and the voltage detection circuit VDC4 and the voltage to current conversion circuit V/C·CONV4 to the node Y2. Components identical to those shown in FIG. 1 are denoted by similar reference numerals, and explanation thereof will be omitted.

As described above, light emitted from the LED XLED is received through the rotary slit XSLT by the phototransistors X1PT, X2PT, and voltages V (X1), V (X2) at the nodes X1, X2 are varied in accordance with the amount of received light thereof.

The voltage detection circuit VDC1 detects the voltage V (X1) at the node X1, and outputs a detected voltage signal to the voltage to current conversion circuit V/C·CONV1. The voltage to current conversion circuit V/C·CONV1 converts the voltage signal into a current signal, and draws current in accordance with the voltage V (X1) at the node X1 from the node X1 to a ground voltage VSS terminal. A current value at this time is set to be larger as the voltage V (X1) at the node X1 is lower. Similarly, the voltage detection circuit VDC2 detects the voltage V (X2) at the node X2, and outputs a detected voltage signal to the voltage to current conversion circuit V/C·CONV2. The voltage to current conversion circuit V/C·CONV2 converts the voltage signal into a current signal, and draws current in accordance with the voltage V (X2) at the node X2 from the node X2 to a ground voltage VSS terminal. A current value at this time is set to be larger as the voltage V (X2) at the node X2 is lower.

Thus, as described above with reference to the first embodiment, since values of currents flowing from the node X1 to the ground voltage VSS terminal and from the node X2 to the ground voltage VSS terminal are increased as the voltages V (X1), V (X2) at the nodes X1, X2 are lowered, the voltages V (X1), V (X2) at the nodes X1, X2 are lowered at accelerating paces.

Additionally, though explanation is omitted, for voltages V (Y1), V (Y2) at the nodes Y1, Y2, similarly, values of currents flowing from the node Y1 to a ground voltage VSS terminal and from the node Y2 to the ground voltage VSS terminal are increased as the voltages V (Y1), V (Y2) at the nodes Y1, Y2 are lowered. Thus, the voltages V (Y1), V (Y2) at the nodes Y1, Y2 are lowered at accelerating paces.

As in the case of the first embodiment, in the second embodiment, preferably, light intensity of the LEDs XLED, YLED is set high, and/or receiving sensitivity of the phototransistors X1PT, X2PT, Y1PT, Y2PT is set high.

Figure 7:
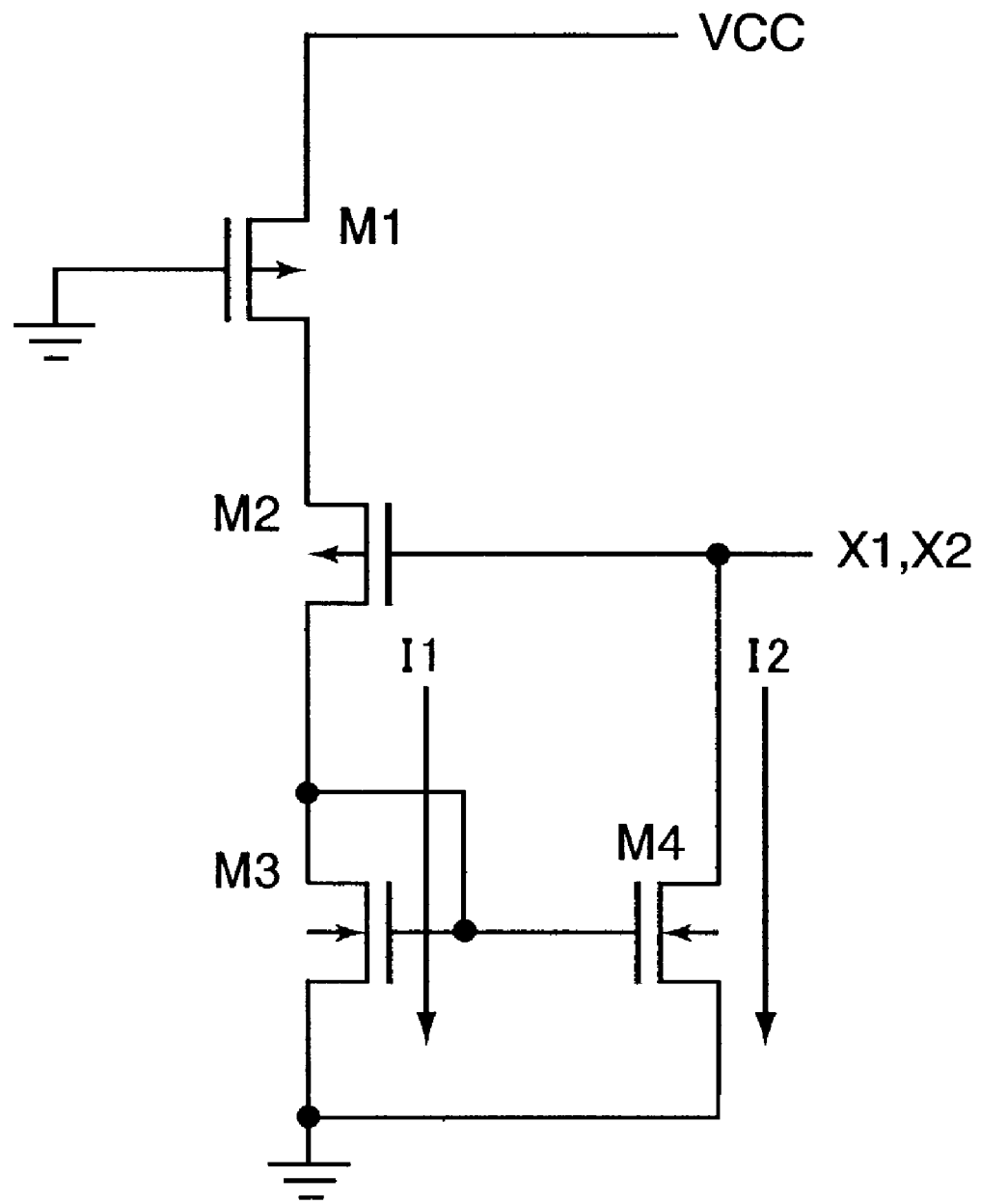
FIG. 7 is a circuit diagram showing an example of circuitry of a variable current source in the second embodiment.

FIG. 7 shows a constitution of the voltage detection circuit VDC1 and the voltage to current conversion circuit V/C·CONV1, and similarly specific circuitry of the voltage detection circuit VDC2 and the voltage to current conversion circuit V/C·CONV2 in the circuit XCT2. Constitution of the voltage detection circuit VDC3 and the voltage to current conversion circuit V/C·CONV3, similarly specified circuitry of the voltage detection circuit VDC4 and the voltage to current conversion circuit V/C·CONV4 in the circuit YCT2, and the specific circuit operations thereof are similar to those of the circuit XCT2, and this explanation will be omitted.

In order to supply power supply voltage VCC to a source of a P channel MOS transistor M2, a source and a drain of a P channel MOS transistor M1 turned ON by grounding its gate are connected in series between the source of the transistor M2 and a power supply voltage VCC terminal. A gate of the transistor M2 is connected to the node X1 or X2, and the voltage V (X1) at the node X1 or the voltage V (X2) at the node X2 is detected.

An input terminal of current mirror circuit constituted of N channel MOS transistors M3 and M4 is connected to a drain of the transistor M2, and its output terminal is connected to the node X1 or X2. More specifically, a gate and a drain of the transistor M3 are connected to the drain of the transistor M2, and its source is grounded. A drain of the transistor M4 is connected to the node X1 or X2, its gate is connected to a gate and a drain of the transistor M3, and its source is grounded.

Accordingly, the transistor M2 detects the voltage at the node X1 or X2. Current I1 in accordance with this voltage flows through the transistors M1, M2 and M3 to the ground voltage VSS terminal, and current I2 in accordance with this current I1 further flows from the node X1 or X2 through the transistor M4 to the ground voltage VSS terminal. In this case, a ratio of current I1 to I2 is determined based on a size ratio of the transistors M3 to M4, which is a ratio of the current mirror circuit.

If the voltage V (X1) or V (X2) at the node X1 or X2 is high, the transistor M2 approaches to an OFF state, and the current I1 flowing from the power supply VCC terminal through the transistors M1, M2, and M3 to the ground voltage VSS terminal becomes extremely small. In this case, since the current I2 flowing from the node X1 or X2 through the transistor M4 to the ground voltage VSS terminal also becomes small, the function for lowering the voltage V (X1) or V (X2) at the node X1 or X2 is hardly performed.

As the voltage V (X1) or V (X2) at the node X1 or X2 is lowered, the transistor M2 gradually approaches to the ON state, and the current I1 flowing from the power supply voltage VCC terminal through the transistors M1, M2, and M3 to the ground voltage VSS terminal is increased. Accordingly, since the current I2 flowing from the node X1 or X2 through the transistor M4 to the ground voltage VSS terminal is similarly increased, a negative resistor function is performed to lower the voltage V (X1) or V (X2) at the node X1 or X2 at an accelerating pace.

As described above, by setting the light intensity of the LED XLED high and/or setting the receiving sensitivity of the phototransistors X1PT, X2PT high, while almost no light is received because of the interruption of the light by the rotary slit XSLT, the voltage V (X1) or V (X2) at the node X1 or X2 floats at a level greater than the ground voltage VSS in the circuit shown in FIG. 1. However, according to the embodiment, due to the current flowing from the node X1 or X2 to the ground voltage VSS terminal, the voltage V (X1) or V (X2) at the node X1 or X2 is lowered almost close to the ground voltage VSS.

Therefore, in voltage waveforms at the nodes X1, X2, the voltage range between the upper and lower points of intersection of both voltage waveforms can be wider than that in the case of the circuit shown in FIG. 1.

Figure 8A:
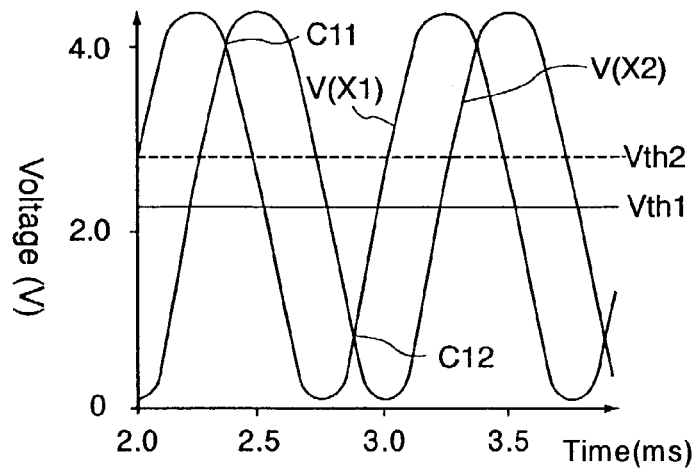
FIG. 8A is a graph showing voltage waveforms at output nodes X1, X2 of phototransistors and thresholds of comparators in the second embodiment.

FIG. 8A shows voltage waveforms V (X1), V (X2) at the nodes X1, X2 of the second embodiment. Further, FIG. 8B shows output waveforms of the respective comparators X1COMP, X2COMP when a threshold (=reference voltage Vref) of the comparators X1COMP, X2COMP is Vth1 shown in FIG. 8A, and FIG. 8C shows output waveforms of the respective comparators X1COMP, X2COMP when a threshold of the comparators X1COMP, X2COMP is Vth2 shown in FIG. 8A.

As described above, in order to identify a rotational direction of the rotary slit XSLT, threshold voltage Vth must be ranged between the upper and lower points C11, C12 at which the voltage waveforms V (X1), V (X2) at the nodes X1, X2 intersect each other.

Figure 8B:
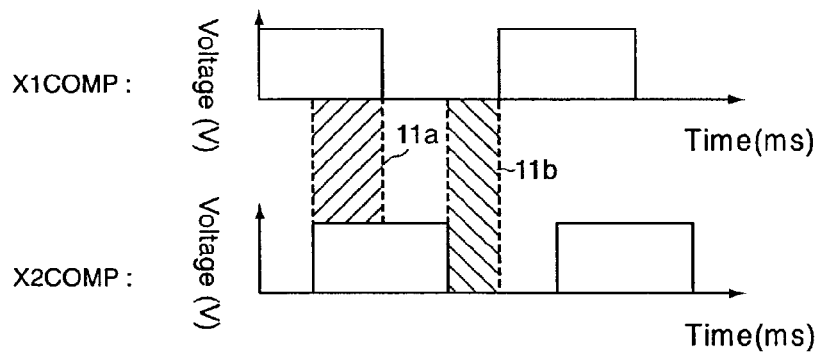
FIG. 8B is a graph showing output waveforms of the comparators X1COMP, X2COMP when the threshold voltage is Vth1 shown in FIG. 8A.

Since the threshold Vth1 ranges between the points C11, C12, for outputs of the comparators X1COMP, X2COMP, there are an overlapping period 11a of high levels and an overlapping period 11b of low levels as shown in FIG. 8B. Thus, it is possible to identify the rotational direction of the rotary slit XSLT.

Figure 8C:
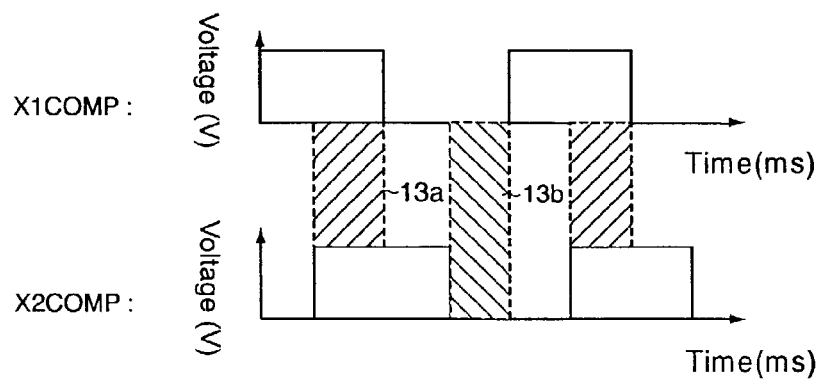
FIG. 8C is a graph showing output waveforms of the comparators X1COMP, X2COMP when the threshold voltage is Vth2 shown in FIG. 8A.

Further, also in the case of the threshold Vth2, since Vth2 ranges between the points C11 and C12 at which the voltage waveforms intersect each other, for outputs of the comparators X1COMP, X2COMP, there are an overlapping period 13a of high levels and an overlapping period 13b of low levels as shown in FIG. 8C, whereby the rotational direction of the rotary slit XSLT can be identified.

Figure 9A:
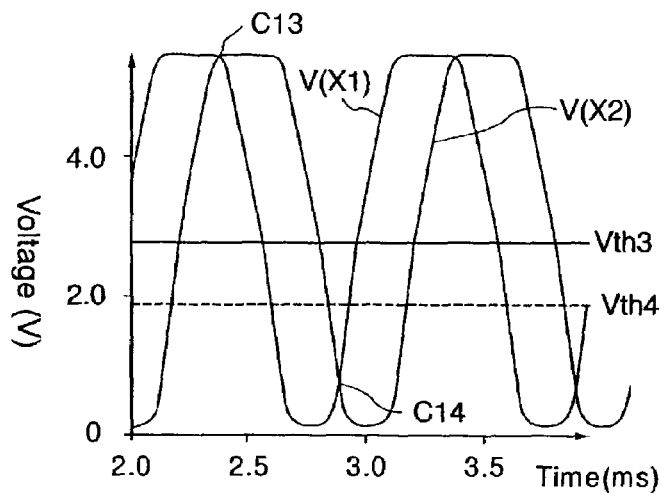
FIG. 9A is a graph showing voltage waveforms at the output nodes of X1, X2 of the phototransistors and a threshold of the comparators when light intensity of an LED or receiving sensitivity of the phototransistor is high in the second embodiment.
Figure 9B:
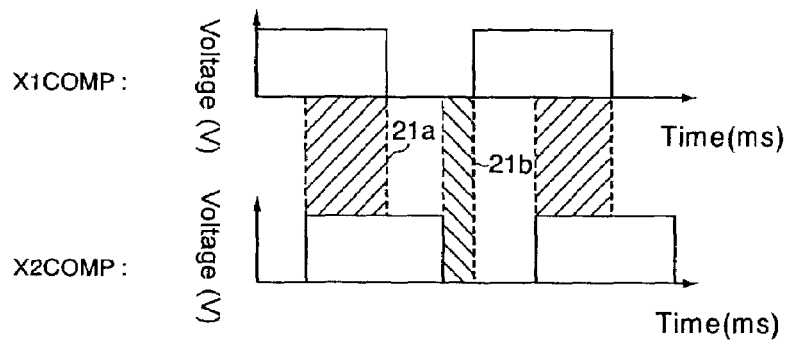
FIG. 9B is a graph showing output waveforms of the comparators X1COMP, X2COMP when the threshold voltage is Vth1 shown in FIG. 9A.

If the light intensity of the LED is much higher than that shown in FIG. 8A, and/or if the sensitivity of the phototransistor is high, the voltage waveforms V (X1), V (X2) at the nodes X1, X2 are similar to those shown in FIG. 9A. FIG. 9B shows output waveforms of the comparators X1COMP, X2COMP when a threshold of the comparators X1COMP, X2COMP is Vth3 shown in FIG. 9A, and FIG. 9C shows output waveforms of the comparators X1COMP, X2COMP when a threshold of the comparators X1COMP, X2COMP is Vth4 shown in FIG. 9A.

Since the threshold Vth3 ranges between points C13 and C14 at which the voltage waveforms intersect each other, for outputs of the comparators X1COMP, X2COMP, there are an overlapping period 21a of high levels and an overlapping period 21b of low levels as shown in FIG. 9B. Accordingly, it is possible to identify a rotational direction of the rotary slit XSLT.

Figure 9C:
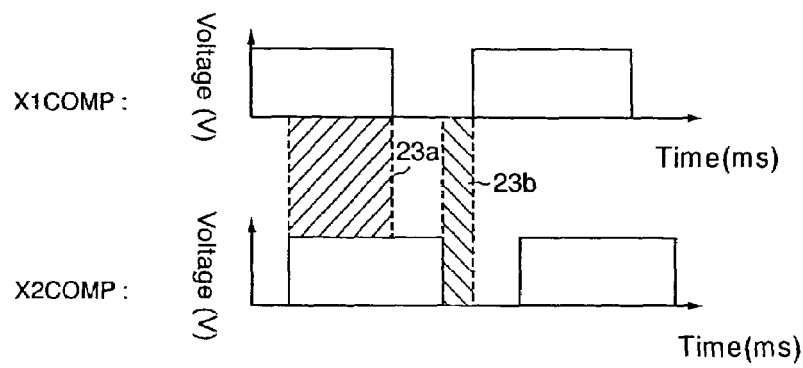
FIG. 9C is a graph showing output waveforms of the comparators X1COMP, X2COMP when the threshold voltage is Vth2 shown in FIG. 9A.

Similarly, since the threshold Vth4 ranges between the points C13 and C14 at which the voltage waveforms intersect each other, for outputs of the comparators X1COMP, X2COMP, there are an overlapping period 23a of high levels and an overlapping period 23b of low levels as shown in FIG. 9C, whereby the rotational direction of the rotary slit XSLT can be identified.

Therefore, even if there is a large variance in characteristics between the LED and the phototransistor, a voltage range within which the threshold voltage Vth should be set so as to identify the rotational direction is widened, and the threshold voltage Vth ranges within this voltage range. Thus, it is possible to obtain stable photodetection without increasing accuracy of mechanical arrangement or the like such as a distance between the LED and the rotary slit or between the phototransistor and the rotary slit, contributing to a cost reduction.

Figure 10:
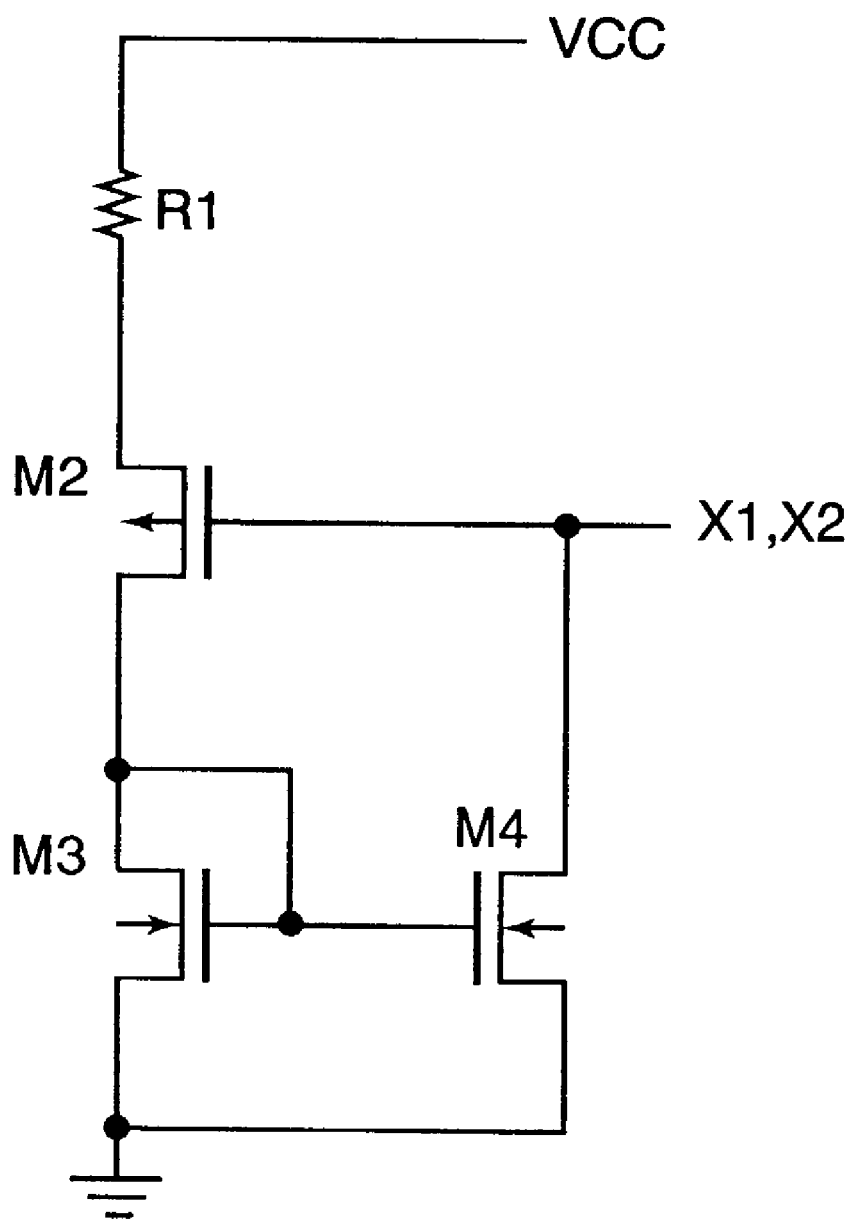
FIG. 10 is a circuit diagram showing another example of circuitry of a variable current source in the second embodiment.

In this case, by setting a size of the transistor M1 relatively smaller regarding a size ratio of the transistor M1 to the transistor M2, the transistor M1 operates as a resistive element. Thus, as shown in FIG. 10, in place of the transistor M1, a resistor R1 may be connected in series between the power supply voltage VCC terminal and the source of the transistor M2. Also in this case, this operation is similar to that of the circuit shown in FIG. 7.

(3) Third Embodiment

Figure 11:
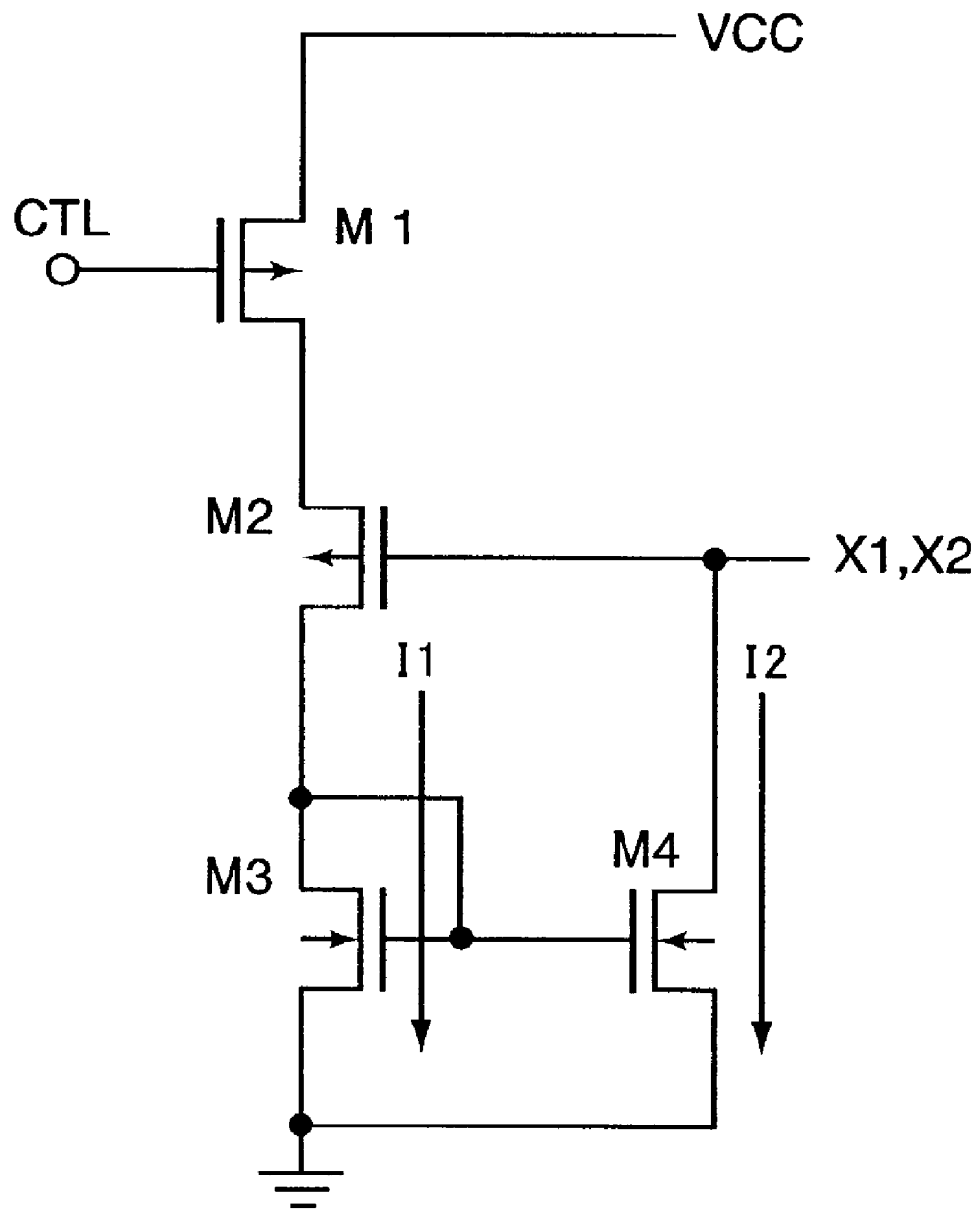
FIG. 11 is a circuit diagram showing a constitution of an optical sensing circuit according to a third embodiment of the present invention.

In the aforementioned second embodiment, as shown in FIG. 7, the gate of the P channel MOS transistor M1 is grounded, and transistor M1 is always maintained ON. On the other hand, according to the third embodiment, as shown in FIG. 11, a control signal CTL is input to a gate of a transistor M1. This control signal CTL is applied by, for example, a central processing unit of a not-shown computer. For example, a control signal which becomes a low level when a pointing device is in an operating state and a high level when it is in a suspended state is input to the gate of the transistor M1, and accordingly the transistor M1 is turned OFF in the suspended state. Thus, the entire circuit is not operated, and wasteful current consumption can be prevented. Since the low-level control signal CTL is applied to turn ON the transistor M1 when the pointing device is in the operating state, an operation is similar to that of the second embodiment.

(4) Fourth Embodiment

In the aforementioned second and third embodiments, current values flowing from the nodes X1, X2 to the ground voltage VSS terminal are fixed in accordance with the voltages V (X1), V (X2) at the nodes X1, X2 detected by the voltage detection circuits VDC1, VDC2. More specifically, a current mirror ratio is fixed, which is determined based on a size ratio of the transistors M3 to M4 in the current mirror circuit shown in FIG. 7, 10 or 11.

Figure 12:
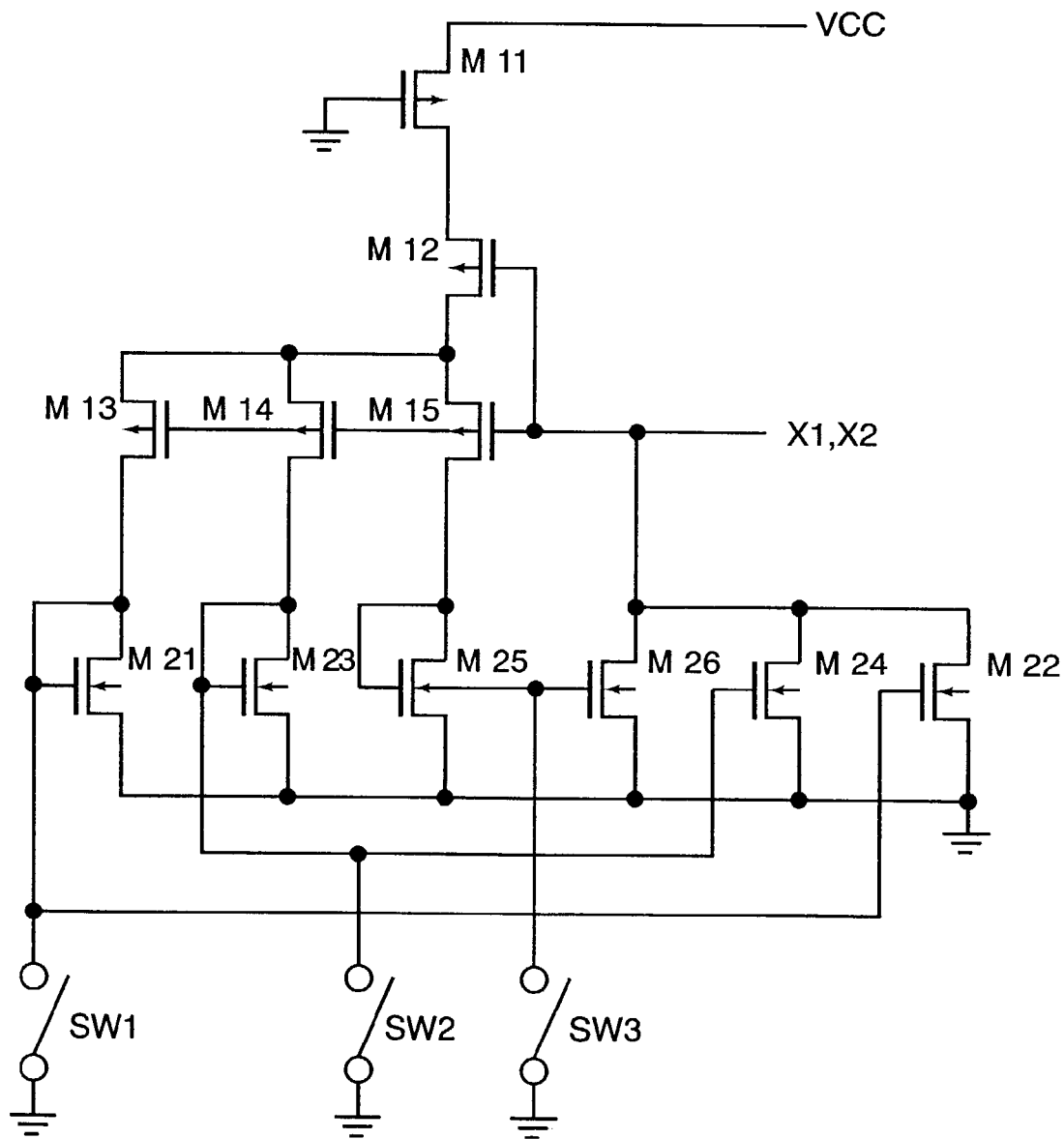
FIG. 12 is a circuit diagram showing a constitution of an optical sensing circuit according to a fourth embodiment of the present invention.

On the other hand, according to the fourth embodiment, a current mirror ratio can be selected in stages among a plurality of values. FIG. 12 shows a constitution of the fourth embodiment.

A source of a P channel MOS transistor M11 is connected to a power supply voltage VCC terminal, a gate is grounded, and the transistor M11 is maintained ON. A source of a P channel MOS transistor M12 is connected to a drain of the transistor M11, and its gate is connected to a node X1 or X2. Further, corresponding to later-described three current mirror circuits, sources of three P channel MOS transistors M13 to M15 are connected to a drain of the transistor M12, and gates thereof are connected to the node X1 or X2.

The current mirror circuits are respectively constituted to include N channel MOS transistors M21 and M22 corresponding to the transistor M13, N channel MOS transistors M23, M24 corresponding to a transistor M14, and N channel MOS transistors M25, M26 corresponding to a transistor M15.

A gate and a drain of the transistor M21 are connected to a drain of the transistor M13, and its source is grounded. A drain of the transistor M22 is connected to the node X1 or X2, its gate is connected to the drain and the gate of the transistor M21, and its source is grounded integrally with the source of the transistor M21.

A gate and a drain of the transistor M23 are connected to a drain of the transistor M14, and its source is grounded. A drain of the transistor M24 is connected to the node X1 or X2, its gate is connected to the drain and the gate of the transistor M23, and its source is grounded integrally with the source of the transistor M23.

A gate and a drain of the transistor M25 are connected to a drain of the transistor M15, and its source is grounded. A drain of the transistor M26 is connected to the node X1 or X2, its gate is connected to the drain and the gate of the transistor M25, and its source is grounded integrally with the source of the transistor M25.

Further, a switch SW1 is connected between the gate and the drain of the transistor M21, the gate of the transistor M22 and the ground voltage VSS terminal. Similarly, a switch SW2 is connected between the gate and the drain of the transistor M23, the gate of the transistor M24 and the ground voltage VSS terminal. Additionally, a switch SW3 is connected between the gate and the drain of the transistor M25, the gate of the transistor M26 and the ground voltage VSS terminal.

Figure 13:
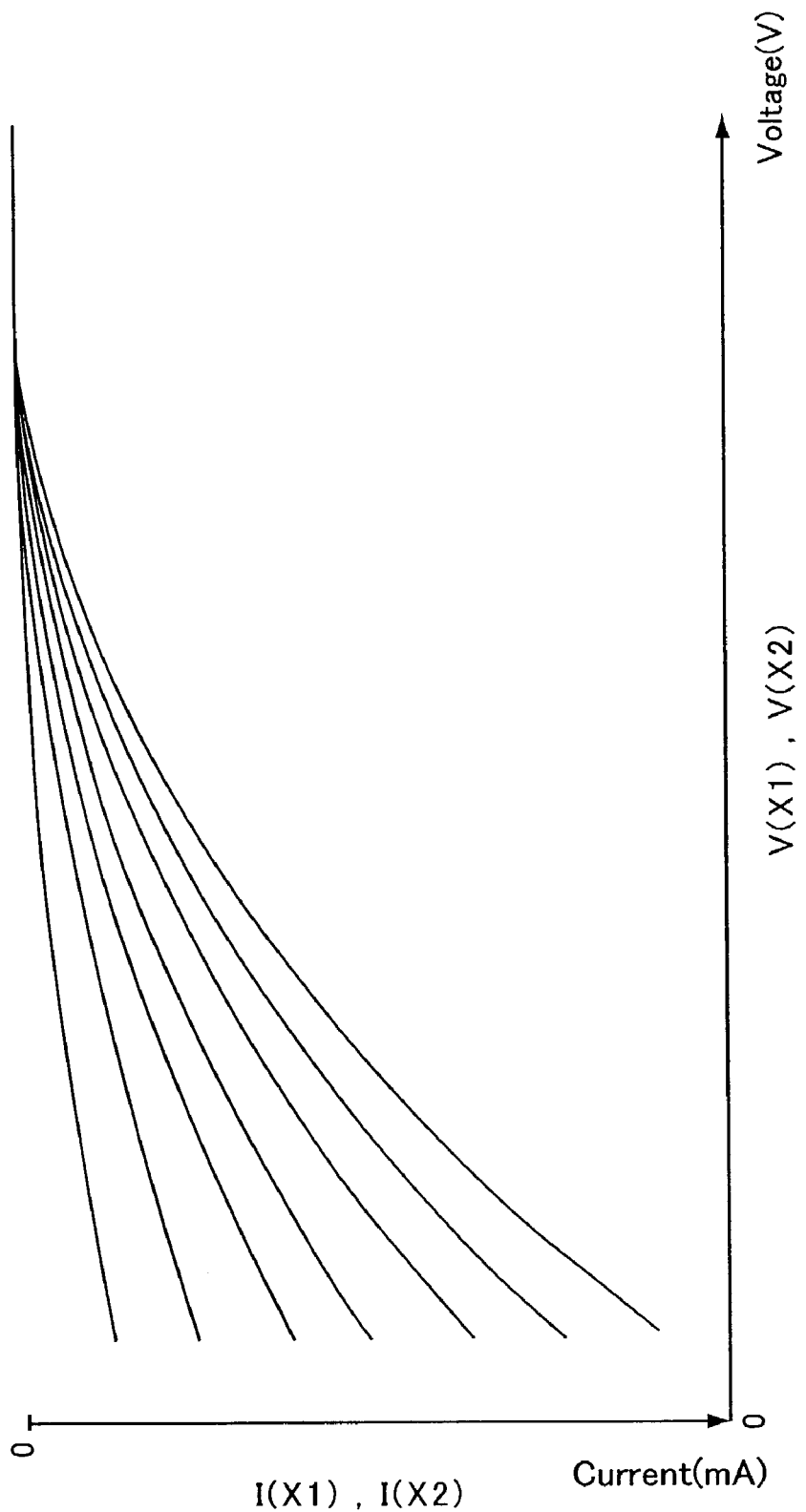
FIG. 13 is a graph showing voltage-current characteristics in an output terminal of a photodetector in the fourth embodiment.

Thus, according to the fourth embodiment, there are a first current mirror circuit constituted of the transistors M21, M22 for driving current in accordance with voltage at the node X1 or X2 detected by the transistors M12, M13, a second current mirror circuit constituted of the transistors M23 and M24 for driving current in accordance with voltage at the node X1 or X2 detected by the transistors M12, M14, and a third current mirror circuit constituted of the transistors M25 and M26 for driving current in accordance with voltage at the node X1 or X2 detected by the transistors M12, M15. Then, the circuit in which the corresponding switches SW1 to SW3 are OFF is operated, and the circuit in which the corresponding switches are ON is not operated. For example, only the first current mirror circuit is operated when the switches SW2 and SW3 are ON, and only the second current mirror circuit is operated when the switches SW1 and SW3 are ON. A size ratio of the transistors M21 to M22 in the first current mirror circuit, a size ratio of the transistors M23 to M24 in the second current mirror circuit, and a size ratio of the transistors M25 to M26 in the third current mirror circuit are set different from one another, e.g., 1:2:4. Accordingly, a desired current mirror ratio, and a desired one of the voltage-current characteristics in the output terminal of the phototransistor shown in FIG. 13 can be selected in accordance with characteristics of the LED or the phototransistor, characteristics changed depending on the shape of the rotary slit or arrangement of the respective components, or the like, and a stable photodetection output can be obtained. Incidentally, though explanation is omitted, the circuit of FIG. 12 can be applied not only to the circuit for detecting an X-direction movement but also to the circuit for detecting a Y-direction movement.

The foregoing embodiments are all examples, and not limited to the present invention. For example, the circuitry shown in each of FIGS. 6, 7, 10 to 12 is an example, and various modifications and variations can be made such as reversal of transistor polarity.

While there has been illustrated and described embodiments of the present invention, it will be understood by those skilled in the art that various change and modifications may be made, and equivalents may be substituted for devices thereof without departing from the true scope of the invention. In addition, many modifications may be made to adapt a particular situation or material to the teaching of the present invention without departing from the central scope thereof. Therefore, it is intended that this invention not be limited to the particular embodiment disclosed, but that invention include all embodiments falling the scope of the appended claims.

What is claimed is:

1. An optical sensing circuit, comprising:
   a power supply;
   a light source;
   a light detector detecting light from the light source, the light detector having an output terminal;
   a voltage to current conversion circuit, including an electrically resistive element connected between the output terminal of the light detector and a reference potential terminal to provide a voltage in response to an output of the light detector, the voltage to current conversion circuit being configured to lower the voltage at the output terminal by increasing a value of an electric current flowing from the output terminal of the light detector to the reference potential terminal as the voltage provided by the resistive element decreases; and
   a comparator circuit configured to compare the voltage provided by the resistive element with a reference voltage.

2. An optical sensing circuit according to claim 1, wherein the voltage to current conversion circuit includes a MOS transistor of a first conductivity type, a source electrode of which is connected to a first power supply terminal and a gate electrode of which is connected to the output terminal of the light detector, and a current mirror circuit including a plurality of MOS transistors of a second conductivity type, an input terminal of which is connected to a drain of the MOS transistor of the first conductivity type and output terminal of which is connected to the output terminal of the light detector.

3. An optical sensing circuit according to claim 2, wherein the current mirror circuit comprises a first MOS transistor of the second conductivity type, gate and drain electrodes of which are connected to the drain electrode of the MOS transistor of first conductivity type and a source of which is connected to the reference potential terminal, and a second MOS transistor of the second conductivity type, a drain electrode of which is connected to the output terminal of the light detector, a gate electrode of which is connected to the gate and the drain electrodes of the first MOS transistor, and a source electrode of which is connected to the reference potential terminal.

4. An optical sensing circuit according to claim 2, wherein the source electrode of the MOS transistor of the first conductivity type is connected to the power supply terminal through an electrically resistive element.

5. An optical sensing circuit according to claim 2, wherein the source electrode of the MOS transistor of the first conductivity type is connected to the power supply terminal through a transistor.

6. An optical sensing circuit according to claim 2, wherein the source electrode of the MOS transistor of the first conductivity type is connected to the power supply terminal through a transistor which receives a control signal to be controlled for an on/off state at the gate electrode thereof.

7. An optical sensing circuit according to claim 1, wherein the voltage to current conversion circuit comprises a MOS of a first conductivity type, a source electrode of which is connected to a power supply terminal of the power supply and a gate electrode of which is connected to the output terminal of the light detector, and
a plurality of current mirror circuits including a plurality of MOS transistors of a second conductivity type, input terminals of which are connected to a drain electrode of the corresponding MOS transistor of the first conductivity type, output terminals of which are connected to the output terminal of the light detector and which are connected in parallel to the reference potential terminal through a switch,
wherein electric current values flowing from the output terminals of the light detector to the reference potential terminal in the plurality of current mirror circuits differ from each other, depending on voltages of the output terminals of the light detector, and the switch is selectively switched to operate at least one of the plurality of current mirror circuits.

8. An optical sensing circuit according to claim 7, wherein each of the current mirror circuits comprises a first MOS transistor of the second conductivity type, gate and drain electrodes of which are connected to the drain of the corresponding MOS transistor of the first conductivity type and to the reference potential terminal through the switch, and a source electrode of which is connected to the reference potential terminal, and a second MOS transistor of the second conductivity type, a drain electrode of which is connected to the output terminal of the light detector, a gate of which is connected to the gate and the drain of the first MOS transistor, and a source electrode of which is connected to the reference potential terminal.

9. An optical sensing circuit according to claim 1, wherein for each light source there are a plurality of pairs of the voltage to current conversion circuits and the comparator circuits.

10. An optical sensing circuit according to claim 1, wherein the reference potential terminal is connected to a ground voltage terminal, and the reference voltage has a value between the voltage of the power supply terminal and the voltage of the reference potential terminal.

11. An optical sensing circuit according to claim 1, wherein the voltage to current conversion circuit is configured to increase a value of the current flowing from the output terminal at an increasing rate as a value of the voltage at the output terminal is lowered.

12. An optical sensing circuit according to claim 1, wherein the voltage to current conversion circuit comprises a current mirror circuit including a pair of gate-electrodes-connected MOS transistors.

13. An optical sensing circuit according to claim 1, wherein the voltage to current conversion circuit comprises a plurality of current mirror circuits, each current mirror circuit including a pair of gate-electrodes-connected MOS transistors, and a size of the other of each pair of the MOS transistors in the current mirror circuits is different from each other.

14. A pointing device comprising:
a first optical sensing circuit configured to produce a signal indicating a moving amount and a moving distance in a first direction, and
a second optical sensing circuit configured to produce a signal indicating a moving amount and a moving distance in a second direction different from the first direction,
each of the first and second optical sensing circuits, comprises
a light source;
a first light detector connected between a power supply terminal and a reference potential terminal, configured to output a first voltage to a first output terminal in accordance with an amount of detected light from the light source;
a second light detector configured to output a second voltage to a second output terminal in accordance with an amount of detected light from the light source, the second voltage having a relative 90 degrees phase difference from the first voltage;
a rotary slit arranged between the light source and the first and second light detector, configured to rotate in accordance with a movement of the pointing device in the first direction or the second direction and to pass or interrupt the light from the light source to the first and second light detectors;
a first voltage to current conversion circuit including a first electrically resistive element connected between the first output terminal of the first light detector and a first reference potential terminal to provide the first voltage in response to the first output of the first light detector, the first voltage to current conversion circuit being configured to lower the voltage at the first output terminal by increasing a value of current flowing from the first output terminal as the voltage at the first output terminal is lowered;
a second voltage to current conversion circuit including a second electrically resistive element connected between the second output terminal of the second light detector and a second reference potential terminal to provide the second voltage in response to the second output of the second light detector, the second voltage to current conversion circuit being configured to lower the voltage at the second output terminal by increasing a value of current flowing from the second output terminal as the voltage at the second output terminal is lowered;
a first comparator circuit configured to compare the voltage at the first output terminal with a reference voltage, and to output a first signal in accordance with a result of the comparison; and
a second comparator circuit configured to compare the voltage at the second output terminal with the reference voltage, and to output a second signal in accordance with a result of the comparison.

15. A pointing device according to claim 14, wherein each of the first and second voltage to current conversion circuits comprises a MOS transistor of a first conductivity type, a source electrode of which is connected to the power supply terminal and a gate electrode of which is connected to the output terminal of the light detector, and a current mirror circuit including a plurality of MOS transistors of a second conductivity type, an input terminal of which is connected to a drain electrode of the MOS transistor of the first conductivity type and an output terminal of which is connected to the output terminal of the corresponding light detector.

16. A pointing device according to claim 15, wherein the current mirror circuit comprises a first MOS transistor of a second conductivity type, gate and drain electrodes of which are connected to the drain electrode of the MOS transistor of first conductivity type and source electrode of which is connected to a second power supply terminal, and a second MOS transistor of the second conductivity type, a drain electrode of which is connected to the output terminal of the corresponding light detector, a gate electrode of which is connected to the gate and drain electrode of the first MOS transistor and a source electrode of which is connected to the second power supply terminal.

17. A pointing device according to claim 15, wherein the source electrode of the MOS transistor of the first conductivity type is connected to the power supply terminal through a resistive element.

18. A pointing device according to claim 15, wherein the source electrode of the MOS transistor of the first conductivity type is connected to the power supply terminal through a transistor.

19. A pointing device according to claim 15, wherein the source electrode of the MOS transistor of the first conductivity type is connected to the power supply terminal through a transistor which receives a control signal to be controlled for an on/off state at the gate thereof.

20. A pointing device according to claim 14, wherein each of the first and second voltage to current conversion circuit comprises a plurality of MOS transistors of a first conductivity type, source electrodes of which are connected to a power supply terminal and gate electrodes of which are connected to the output terminal of the corresponding light detector, and a plurality of current mirror circuits including a plurality of MOS transistors of a second conductivity type, input terminals of which are connected to drain electrodes of the corresponding MOS transistors of the first conductivity type, output terminals of which are connected to the output terminal of the corresponding light detector and which are connected in parallel to a reference potential terminal through a switch, and wherein current values flowing from the output terminals of the corresponding light detector to the reference potential terminal in the plurality of current mirror circuits differ from each other, depending on voltages of the output terminals of the corresponding light detector, and the switch is selectively switched to operate at least one of the plurality of current mirror circuits.

21. A pointing device according to claim 20, wherein each of the current mirror circuits comprises a first MOS transistor of the second conductivity type, gate and drain electrodes of which are connected to the drain electrode of the corresponding MOS transistor of the first conductivity type and to the reference potential terminal through the switch, and a source electrode of which is connected to the reference potential terminal, and a second MOS transistor of the second conductivity type, a drain electrode of which is connected to the output terminal of the corresponding light detector, a gate electrode of which is connected to the gate and drain electrode of the first MOS transistor, and a source electrode of which is connected to the reference potential terminal.

22. A pointing device according to claim 14, wherein the first and second light detectors and the first and second voltage-to-current-conversion circuits are connected between a power supply terminal and a reference potential terminal, the reference potential terminal is connected to a ground voltage terminal, and the reference voltage has a value between the voltage of the power supply terminal and the voltage of the reference potential terminal.

23. A pointing device according to claim 14, wherein the first and second voltage to current conversion circuits are each configured to increase a value of the current flowing from the respective first and second output terminals at an increasing rate as a value of the voltage at the respective first and second output terminals is lowered.

24. A pointing device according to claim 14, wherein each of the first and second voltage to current conversion circuit comprise a plurality of current mirror circuits, each current mirror circuit including a pair of gate-electrodes-connected MOS transistors, and a size of each of the pair of MOS transistors in the current mirror circuits is different from each other.

25. An optical sensing circuit, comprising:
a light detector;
a voltage to current conversion circuit including an electrically resistive element and a negative resistance circuit connected in parallel to the resistive element, the voltage to current conversion circuit being connected to the light detector and configured to increase a value of current flowing through the negative resistance circuit as a voltage of the output decreases and a comparator configured to compare the voltage of the output with a reference voltage.

26. An optical sensing circuit according to claim 25, wherein the voltage to current conversion circuit is configured to increase the value of the current flowing through the negative resistance circuit at an increasing rate as the voltage of the output decreases.

27. An optical sensing circuit according to claim 25, wherein the negative resistance circuit comprises a current mirror circuit including a pair of gate electrode connected MOS transistors.

28. An optical sensing circuit according to claim 25, wherein the voltage to current conversion circuit comprises a plurality of current mirror circuits, each current mirror circuit including a pair of gate-electrode-connected MOS transistors, and respective ratios of a size of one of the pair of MOS transistors to a size of the other of the pair of MOS transistors in the current mirror circuits are different from each other.

29. An optical sensing circuit according to claim 25, wherein the voltage to current conversion circuit comprises a MOS transistor of a first conductivity type, a source electrode of which is connected to a first power supply terminal and a gate electrode of which is connected to the output of the light detector, and a current mirror circuit including a pair of MOS transistors of a second conductivity type, an input terminal of the current mirror circuit is connected to a drain electrode of the MOS transistor of the first conductivity type, and an output terminal of the current mirror circuit is connected to the output of the light detector.

30. An optical sensing circuit comprising:
a light detector;
a voltage to current conversion circuit including an electrically resistive element and a negative resistance circuit connected in parallel to the resistive element, the voltage to current conversion circuit being connected to the light detector and configured to increase a value of current flowing through the circuit as a voltage of the output decreases and a comparator configured to compare the voltage of the output with a reference voltage, wherein the voltage to current conversion circuit comprises a plurality of MOS transistors of a first conductivity type, source electrodes of which are connected to a power supply terminal and gate electrodes of which are connected to the output of the light detector, and a plurality of current mirror circuits each including a pair of MOS transistors of a second conductivity type, input terminals connected to drain electrodes of the corresponding MOS transistors of the first conductivity type, output terminals connected to the output of the light detector, and a switch, the current mirror circuits are being connected in parallel to a reference potential terminal through the switch, each of the pairs of MOS transistors in the current mirror circuits being different in size from each other.

* * * * *